United States Patent
Alieiev et al.

(10) Patent No.: US 10,388,082 B2
(45) Date of Patent: Aug. 20, 2019

(54) METHOD FOR SPECTRALLY EFFICIENT DETERMINATION OF COLLECTIVE ENVIRONMENTAL INFORMATION FOR COOPERATIVE AND/OR AUTONOMOUS DRIVING

(71) Applicant: VOLKSWAGEN AG, Wolfsburg (DE)

(72) Inventors: Roman Alieiev, Stendal (DE); Thorsten Hehn, Wolfsburg (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/635,431

(22) Filed: Jun. 28, 2017

(65) Prior Publication Data

US 2018/0005460 A1 Jan. 4, 2018

(30) Foreign Application Priority Data

Jun. 29, 2016 (DE) .................. 10 2016 211 750

(51) Int. Cl.
*G07C 5/00* (2006.01)
*H04W 4/04* (2009.01)
(Continued)

(52) U.S. Cl.
CPC ....... *G07C 5/008* (2013.01); *G08G 1/096791* (2013.01); *G08G 1/163* (2013.01);
(Continued)

(58) Field of Classification Search
CPC ...... G07C 5/008; H04W 4/046; H04W 84/12; B60R 2300/50; G01S 2013/936; G01G 1/163; G01G 1/166; G01G 1/22; G01G 1/161; G01G 1/164; G01G 1/0108; G01G 1/0125; G01G 1/0137; G01G 1/0145; G01G 1/0141; G01G 1/01; G01G 1/017; G01G 1/00; G01G 1/065; G01G 1/20;
(Continued)

(56) References Cited

U.S. PATENT DOCUMENTS 6,178,374 B1 * 1/2001 Mohlenkamp ... G08G 1/096716
340/905
7,277,028 B1 * 10/2007 Janke ............... G08G 1/096716
340/905
(Continued)

FOREIGN PATENT DOCUMENTS

DE 102007053738 A1 5/2008
DE 102009060358 A1 6/2011
(Continued)

*Primary Examiner* — Omar Casillashernandez
(74) *Attorney, Agent, or Firm* — Barnes & Thornburg LLP

(57) ABSTRACT

A method for the acquisition of collective surroundings information for cooperative and/or autonomous driving. The method includes a vehicle equipped with an on-board unit and surroundings observation apparatus which produces a report about a detected vehicle not equipped with an on-board unit and transmits the report to the further vehicles which are moving or are located in the respective area. The further vehicles which receive the report transmit back a confirmation message to the reporting vehicle and confirm that the further vehicles are happy with the report. The further vehicles then refrain from transmitting a separate report about the unequipped vehicle.

17 Claims, 3 Drawing Sheets

(51) Int. Cl.
*G08G 1/0967* (2006.01)
*G08G 1/16* (2006.01)
*H04W 84/12* (2009.01)
*G08G 1/00* (2006.01)

(52) U.S. Cl.
CPC ............ *G08G 1/166* (2013.01); *H04W 4/046* (2013.01); *G08G 1/22* (2013.01); *H04W 84/12* (2013.01)

(58) Field of Classification Search
CPC ................ G01G 1/048; G01G 1/0967; G01G 1/096791; G01G 1/096775
USPC .......................................................... 340/905
See application file for complete search history.

(56) References Cited

U.S. PATENT DOCUMENTS

| | | | | |
|---|---|---|---|---|
| 7,286,040 B2* | 10/2007 | Karabinis | ............. | G01D 21/00 340/10.1 |
| 7,427,929 B2* | 9/2008 | Bauer | .................... | G08G 1/162 307/9.1 |
| 7,720,026 B2* | 5/2010 | Chen | ...................... | G08G 1/161 370/328 |
| 8,854,197 B2* | 10/2014 | Ikeda | ...................... | G08G 1/165 340/425.5 |
| 9,349,293 B2* | 5/2016 | Beaurepaire | ......... | G08G 1/0962 |
| 9,403,482 B2* | 8/2016 | Shahraray | ................ | B60R 1/00 |
| 9,688,199 B2* | 6/2017 | Koravadi | ............... | B60Q 9/008 |
| 2008/0114531 A1* | 5/2008 | Kagawa | ................ | G08G 1/163 701/119 |
| 2013/0147638 A1* | 6/2013 | Ricci | ......................... | G06F 9/54 340/905 |
| 2015/0287323 A1 | 10/2015 | Wells | | |
| 2016/0071418 A1* | 3/2016 | Oshida | ..................... | G08G 1/22 701/23 |
| 2017/0080952 A1* | 3/2017 | Gupta | .................... | B60K 35/00 |
| 2017/0084175 A1* | 3/2017 | Sedlik | ................. | G08G 1/0112 |
| 2017/0278390 A1* | 9/2017 | Zydek | ................ | G08G 1/09623 |

FOREIGN PATENT DOCUMENTS

DE 102010029465 A1 12/2011
DE 102012023498 A1 6/2014

* cited by examiner

METHOD FOR SPECTRALLY EFFICIENT DETERMINATION OF COLLECTIVE ENVIRONMENTAL INFORMATION FOR COOPERATIVE AND/OR AUTONOMOUS DRIVING

PRIORITY CLAIM

This patent application claims priority to German Patent Application No. 10 2016 211 750.5, filed 29 Jun. 2016, the disclosure of which is incorporated herein by reference in its entirety.

SUMMARY

Illustrative embodiments relate to a method for spectral-efficient acquisition of collective surroundings information for cooperative and/or autonomous driving, during which a vehicle which is equipped with a communication module and surroundings observation means produces a report about a detected vehicle which is not equipped with a communication module and transmits the report to the further vehicles which are moving or are located in the respective area. Reference is made to the fact that the proposal indicates the method with which the distribution can be achieved with the highest possible spectral efficiency. Illustrative embodiments also relate to a reporting vehicle and to a further vehicle for use in the method.

BRIEF DESCRIPTION OF THE DRAWINGS

An exemplary embodiment is illustrated in the drawings and will be explained in more detail below with reference to the figures, of which.

DETAILED DESCRIPTION

Figure 1:
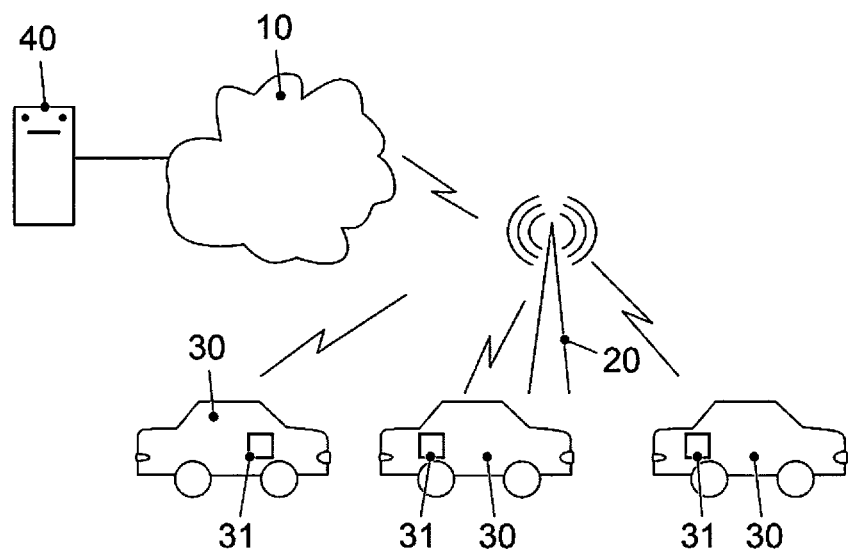
FIG. 1 shows the principle of vehicle communication via mobile radio.

For the scenario of vehicles which are equipped with communication modules and which communicate directly with one another in public road traffic, whether for cooperative or autonomous driving, it is necessary that the vehicles which are not equipped with radio communication are also taken into account. Technologies have already been developed for direct vehicle-to-vehicle communication and are being further developed. The vehicle direct communication via WLAN, here the disclosed embodiment according to the WLAN standard IEEE 802.11p are mentioned as examples of this. In this technology, ad hoc WLAN networks are set up for communication between the vehicles (communication in the field of the "ad hoc domain").

However, vehicle communication is also possible in the field of mobile radio networks. However, with this technology the base station has to transfer the messages from vehicle to vehicle. This is the field in which the communication takes place in the so-called "infrastructure domain". Direct vehicle communication will also be made possible in the next mobile radio generation. In the case of LTE, this disclosed embodiment is called LTE-V (vehicle) and in the case of the 5G initiative this disclosed embodiment is called device-to-device (D2D). This is also the field of vehicle communication with which the disclosed embodiments are concerned.

These more recent mobile radio standards adopt a looser version of the cellular transmission concept to permit direct communication. In this form of communication, the "scheduler" which is located in the base station continues to perform the task of resource allocation, but the communication between vehicles takes place directly without the detour via the base station, what is referred to as side link data traffic.

Typical communication scenarios are safety scenarios, traffic efficiency scenarios and infotainment. The following scenarios are mentioned for the field of safety: "cooperative forward collision warning", "pre-crash sensing/warning", "hazardous location warning". In these areas, the vehicles exchange information with one another such as the position, direction and speed, and also parameters such as the size and weight. Further information which is transmitted relates to information regarding intentions such as "vehicle intends to overtake", "vehicle turns off to the left/right" etc. which are of interest for cooperative driving. In this context, sensor data is often transferred. If a hazardous situation is present and the driver does not react, the car could automatically brake so that an accident is prevented or at least the consequences in the case of an unavoidable accident are kept as insignificant as possible. In the field of "platooning", this concerns the field of driving in a column of vehicles, it is planned, for example, to pass on information about the planned braking behavior from the front to the rear to avoid rear-end accidents.

In the field of traffic efficiency there is: "enhanced route guidance and navigation", "green-light optimal speed advisory" and "V2V merging assistance".

In the field of infotainment the primary concern is the Internet access.

The standard 802.11p is a development specifically for communication between vehicles among each other and the communication between a vehicle and fixed components at the edge of the roadway. The main objectives with the use of the 802.11p standard are to improve road safety and provide reliable emergency services. In this context, the requirements of such a standard also increase. A high level of reliability and the lowest possible latency (exchange of data within hundredths of milliseconds) are required. For this purpose the standard 802.11p uses the physical layer of the 802.11a to make available the physical-technical properties of the connection. The federal network agency in Germany has released the frequency range between 5.850 GHz and 5.925 GHz for the WLAN transmission in car-to-X communication.

Despite the clear benefits of C2x communication, this communication can only be successful if hackers are prevented from being able to log into the system to produce movement patterns of vehicles, to listen in to messages or to be able to feed in incorrect warning messages. To prevent the position of the driver being determined or movement patterns of specific persons being produced, it has been agreed to allocate only a temporary identifier to the vehicle. This means that at specific intervals the vehicle generates a new identifier with which it is not possible to track a vehicle. Secure messages are to be made possible by means of an electronic signature or authentication.

DE 10 2012 023498 A1 discloses a method for automatic and/or assisted vehicle guidance, in which method position-related information about roadway properties is collected by a multiplicity of vehicles by means of surroundings sensor systems and location sensor systems. The information is transmitted to a database by means of vehicle-to-X communication. The stored information in the database is continuously updated and/or added to by the transmitted information. The stored information is then used for transmission to at least one vehicle which is driving through a roadway section which is assigned to the information. In accordance with the stored information, it is decided either in the vehicle itself or in a computer assigned to the database whether the roadway section can be driven through automatically and/or in an assisting way by a vehicle by means of a surroundings sensor system and an autonomous control device.

DE 10 2009 060358 A1 discloses equipping a vehicle in such a way that a quality feature of a radio communication system, here the quality of the network coverage, is transmitted in a position-referenced and/or time-referenced way to a database. In this way, a more precise map as well as a more up to date map relating to the availability of the radio communication system can be produced and then made available to all the subscribers.

DE 10 2010 029465 A1 discloses a motor vehicle communication module in which, in addition to close-range radio connection modules, image-generating and/or distance-measuring sensors such as camera or laser or radar systems are also accommodated.

At present, the following mobile radio technologies can be applied for vehicle-to-vehicle communication: 3GPP-based UMTS, HSPA, LTE and the upcoming 5G standards. LTE-V is mentioned once more for the direct vehicle communication, and D2D is mentioned for the 5G initiative.

In the field of autonomous/cooperative driving, a technology which is referred to as "collective perception" is being developed. For the acquisition of information, cooperatively interacting automobiles have at their disposal not only the vehicle's own sensors but also communicated information from the sensors of other vehicles. The term "collective perception" therefore corresponds to that of cooperative perception of the surroundings of the vehicle.

Collective perception permits, in the case of car-2-car communication, subscribers which are not equipped with radio technology to make themselves visible in the radio domain. This is done by means of equipped vehicles which detect unequipped vehicles by means of sensor systems and radio modules and report about the vehicles.

While contemporary vehicles delete their information after driving through a situation, cooperatively interacting automobiles are to store their knowledge in a collective data- and information base and make this available to traffic following at their rear.

During the implementation of the idea of collective perception, a solution in which each equipped vehicle which detects an unequipped vehicle in the observation range transmits a report about the unequipped vehicle to the other road users has proven disadvantageous: on the one hand, this brings about a drastic increase in the number of reports about an unequipped vehicle depending on the traffic density, which in the case of transmissions in a mobile radio network places heavier loading in the mobile radio cell of the mobile radio network, with the result that less capacity is available for other services. This also applies in principle to the WLAN solution, and there is less capacity available for other data transmissions. On the other hand, the expenditure on the evaluation of all the reports about unequipped vehicles rises for the individual road users or in the central processor unit and there is the risk of reports being mistaken for one another and of contradictory reports.

Disclosed embodiments provide another approach for implementing the idea of collective perception in which the abovementioned drawbacks are avoided. Disclosed embodiments are concerned with the problem of efficient channel use in the implementation of the idea of collective perception for cooperative/autonomous driving.

This is achieved by means of a method for acquiring collective surroundings information for cooperative and/or autonomous driving in which a vehicle equipped with a communication module and surroundings observation means produces a report about a detected vehicle not equipped with a communication module and transmits the report to the further vehicles which are moving or are located in the respective area and/or to a central server, wherein the further vehicles which receive the report transmit back a confirmation message to the reporting vehicle with which the further vehicles indicate that the further vehicles are happy with the report about the unequipped vehicle, and the further vehicles then themselves refrain from transmitting a separate report about the unequipped vehicle. This is further achieved, by a reporting vehicle for use in the method having computing means, a communication module and having surroundings observation means, wherein the computing means produce a report about a vehicle which is not equipped with a communication module if the surroundings observation means have detected the unequipped vehicle in a respective area, wherein the communication module transmits the report to the further vehicles which are moving or are located in the respective area and/or to a central server, wherein the communication module waits, before the further production of a report about the unequipped vehicle, for the confirmation message from at least one further vehicle which received the report, with which confirmation message the further vehicle indicates that the further vehicle is happy with the report about the unequipped vehicle. This is still further achieved by a further vehicle for use in the method, having computing means, a communication module and having surroundings observation means, wherein the communication module transmits back confirmation message to the reporting vehicle if said vehicle has received a report about an unequipped vehicle, wherein the confirmation message indicates that the further vehicle is happy with the report about the unequipped vehicle, and in that the communication module refrains from transmitting a separate report about the unequipped vehicle.

To operate collective perception in a spectrally efficient way, the following solution is proposed:

The vehicle which is equipped with a communication module and which is the first to report about a vehicle which is not equipped with a communication module, transmits the report to the further vehicles which are moving or are located in the respective area and/or to a central processor unit. The reception of this report at the further vehicles leads to a situation wherein the further vehicles transmit back a confirmation to the reporting vehicle and then themselves refrain from transmitting a separate message about the unequipped vehicle if they have detected this vehicle themselves with their observation means.

As a result, the number of reports about an unequipped vehicle which are transmitted via the network is reduced, and as a result the network load is reduced, with the result that more transmission capacity is available for other data transmissions. At the same time, the expenditure on the evaluation of the reports about an unequipped vehicle is reduced at the further vehicles in the respective area or at a central processor unit if the reports are evaluated in the central processor unit.

At least one measure consists in the fact that the reporting vehicle which detects the unequipped vehicle first, that is to say has previously received no message from another vehicle, assigns an unambiguous identifier to the unequipped vehicle and adds this identifier to the report. The unambiguous identifier of the unequipped vehicle is important so that mixing up between reports and contradictory reports about one and the same unequipped vehicle are avoided.

It is also beneficial for the method if the further vehicles transmit back, in the confirmation which is transmitted back to the reporting vehicle, the unambiguous identifier of the unequipped vehicle together with a hash value of the received report in the confirmation to the reporting vehicle. In this way, the reporting vehicle has the possibility of detecting using the hash value whether the report has arrived in an unfalsified form at the further vehicle. Furthermore, the hash value also comprises significantly less data than the actual report.

At least one measure also consists in the fact that the reporting vehicle transmits a sign-off message to the other vehicles and/or to the central processor unit if it exits the respective area. A vehicle which for its part detects the unequipped vehicle will then continue the production of a report about the unequipped vehicle, wherein the vehicle may continue to use the previously allocated unambiguous identifier of the unequipped vehicle. In this way, the production of a report about the unequipped vehicle is carried on quickly if the reporting vehicle exits the respective area. The further vehicles receive, of course, the sign-off message and can rely on the fact that they will come across an unequipped vehicle. They can use the earlier reports to determine the location of the unequipped vehicle.

A very beneficial measure consists in the fact that if the unambiguous identifier is derived at least from the observed position of the unequipped vehicle. It is then possible for the further vehicles to selectively look out for the unequipped vehicle to be able to continue the production of a report about the vehicle more quickly. Since the reports about unequipped vehicles can be kept such that they do not permit any conclusions about the holder of the vehicle or the license plate number is not used as an identifier, this measure would appear to be less problematic in respect of data protection.

For a reporting vehicle, for use in the disclosed method, it is beneficial that the vehicle is equipped with computing means, a communication module and with surroundings observation means, wherein the computing means produce a report about a vehicle which is not equipped with a communication module if the surroundings observation means have detected the unequipped vehicle in a respective area. The communication module may be configured in such a way that it transmits the report to the further vehicles which are moving or are located in the respective area and/or to a central server. The communication module is configured in such a way that it waits, before the further production of a report about the unequipped vehicle, for the confirmation from the at least one further vehicle which has received the report. This ensures that the reports are not transmitted in vain if no further vehicle is traveling in the area.

Furthermore, the following measures are also beneficial for the reporting vehicle. The computing means are configured in such a way that they assign an unambiguous identifier to the unequipped vehicle and add this identifier to the report. The communication module is configured to transmit a sign-off message to the further vehicles and/or the central server if the reporting vehicle exits the respective area. The same benefits are obtained as those already explained above with respect to the corresponding measures for the method.

Beneficial measures are also claimed for a further vehicle for use in the method. It is therefore beneficial that the further vehicle is equipped with computing means, with a communication module and with surroundings observation means. The communication module is configured to transmit back a confirmation message to the reporting vehicle if the vehicle has received a report about an unequipped vehicle. The communication module is also configured to refrain in this case from transmitting a separate report about the unequipped vehicle. As already mentioned, this reduces the network load and more transmission capacity is available for other data transmissions. The expenditure on the evaluation of the reports at the further vehicles is also reduced.

It is also beneficial here that the communication means are configured to transmit back, in the confirmation message, the unambiguous identifier to the unequipped vehicle together with a hash value of the report to the reporting vehicle. The hash value permits the checking as to whether the report has arrived in an unfalsified form and also keeps the confirmation message small.

The computing means and the communication module of the further vehicle may be configured to continue the production of a report about the unequipped vehicle if the surroundings observation means detect the unequipped vehicle and a sign-off message has been received from the reporting vehicle, wherein the computing means may be configured to continue to use the previously allocated unambiguous identifier of the unequipped vehicle for the continuation of the production of a report.

One or more elements of the following components can be used as surroundings observation means
    radar sensor,
    video camera,
    stereo camera,
    plenoptics camera,
    lidar sensor,
    laser sensor,
    ultrasound sensor and
    inclination sensor,
in the reporting vehicle and/or in the further vehicle.

Furthermore it is beneficial if the vehicle has position-determining means with which the position of the unequipped vehicle can be determined or estimated in the spatial and/or chronological direction. This is significant if the identifier for the unequipped vehicle is to specify the position of the unequipped vehicle or is to be at least derived from the position.

The position-determining means can be implemented as the vehicle navigation system which is often already installed in the vehicle. It is therefore possible for the further vehicles to selectively look out for the unequipped vehicle to be able to continue the production of a report about the vehicle more quickly.

The present description illustrates the principles of the disclosure. It goes without saying that specialists will be able to conceive various arrangements which while not being explicitly described here incorporate the principles of the disclosure and are also to be protected in its scope.

FIG. 1 shows the principle of vehicle communication by means of mobile radio. The vehicles are provided with the reference number 30.

The term vehicle is understood as a collective term for vehicles with an internal combustion engine or electric motor, whether motorbikes or other vehicles which are operated by muscle power, whether vehicles with one, two, three, four or more wheels and whether motorbikes, passenger cars, trucks, buses, agricultural vehicles or construction machines. The enumeration is not conclusive and also includes other vehicle categories.

The vehicles in FIG. 1 are each equipped with an on-board unit 31 which serves as a transceiver unit for the mobile communication. All the messages from the vehicles (uplink) and to the vehicles (downlink) are conducted either via a base station 20, which serves a mobile radio cell, or are exchanged directly between the vehicles in the case of direct vehicle communication (sidelink). If the vehicles are located within this mobile radio cell, they are signed on or logged into the base station 20. If the mobile radio cell is exited, the vehicles are handed on to the adjacent cell (handover) and correspondingly signed off or logged out of the base station 20. The base station 20 also makes available an access to the Internet so that the vehicles 30 or all the other mobile subscribers in the mobile radio cell are supplied with Internet data. A central processor unit 40, which serves as database for the collective perception of the surroundings, can also be reached via the Internet 10 or some other long distance network WAN.

This mobile radio technology is standardized and in this respect reference is made to the corresponding specifications of mobile radio standards. Reference is made to the 3GPP initiative and the LTE standard (long term evolution) as a modern example of a mobile radio standard. Many of the associated ETSI specifications are currently available z.Z in version 13. Examples are: ETSI TS 136 213 V13.0.0 (2016 May ); Evolved Universal Terrestrial Radio Access (E-UTRA); physical layer procedures (3GPP TS 36.213 version 13.0.0 Release 13).

Figure 2:
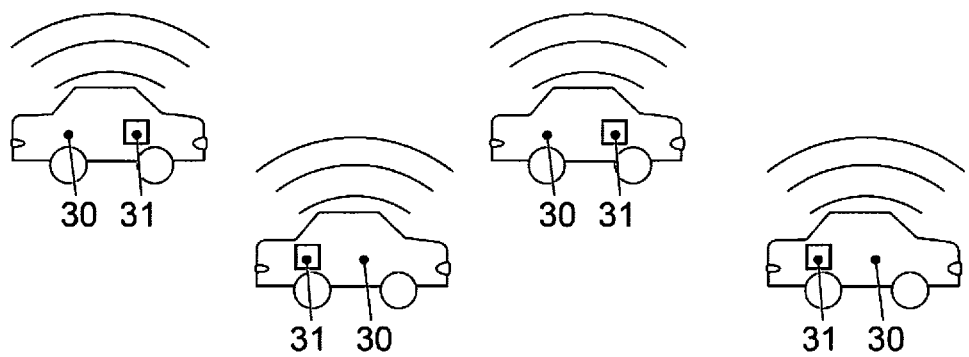
FIG. 2 shows the principle of vehicle communication via an ad hoc WLAN network.

FIG. 2 shows oncoming vehicles 30 whose on-board units 31 are embodied as WLAN communication modules. The standard IEEE 802.11p has been developed for vehicle-to-vehicle communication. The vehicles which are involved in a respective area are networked to form an ad hoc WLAN network. There are also so-called road side units which can also participate in the ad hoc WLAN network. These are radio beacons which are typically installed at the edge of the road. Reference is also made to the so-called ad hoc domain composed of the on-board units 31 of the vehicles 30 and the roadside units.

The main objectives of the development of the standard IEEE 802.11p are to improve road safety and provide reliable emergency services. A high degree of reliability and the lowest possible degree of latency (exchange of data within hundreds of milliseconds) are the main requirements. To do this, the specification IEEE 802.11p uses the physical layer of IEEE 802.11a to make available the physical-technical properties of the connection. The released frequency range for this specification is between 5.850 GHz and 5.925 GHz.

Figure 3:
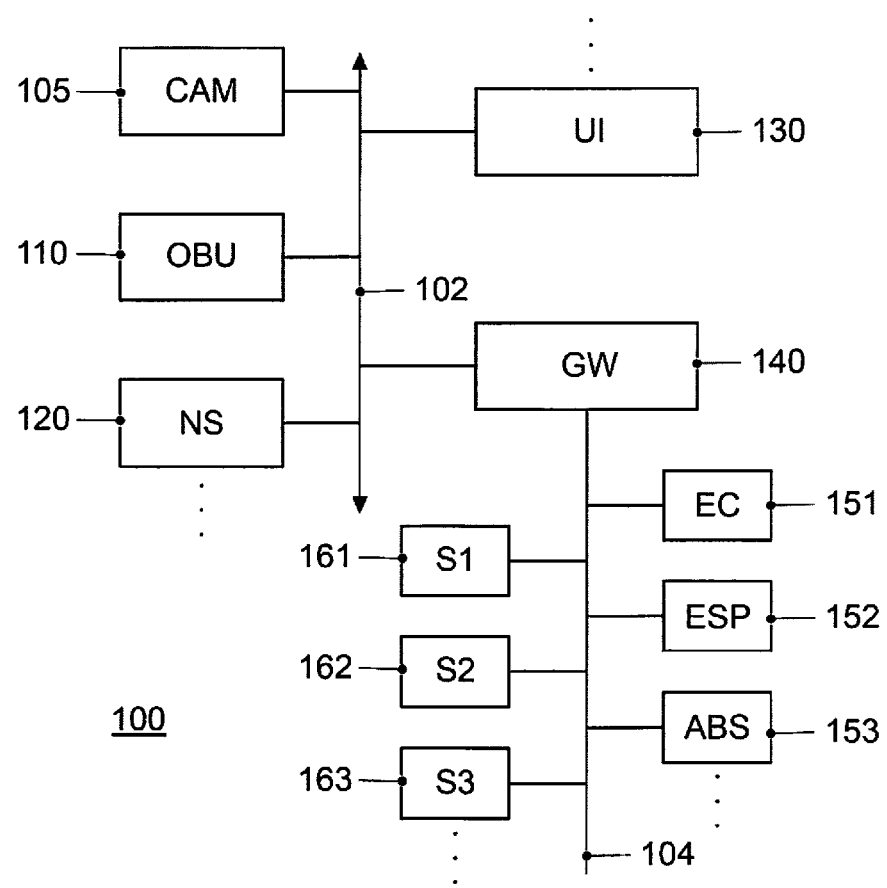
FIG. 3 shows a block diagram for the vehicle electronics of a motor vehicle.

FIG. 3 shows the typical design of a motor vehicle electronics system of a modern motor vehicle. An engine control unit is denoted by the reference number 151. The reference number 152 corresponds to an ESP control device, and the reference number 153 denotes an ABS control device. Further control devices such as a transmission control device, airbag control device etc. can be present in the motor vehicle. The networking for such control devices is typically carried out with the CAN bus system (control area network) 104 which is standardized as an ISO standard, ISO 11898. Since the wide variety of sensors are installed in the motor vehicle and these are no longer connected only to individual control devices, such sensor data is also transmitted via the bus system 104 to the individual control devices. Examples of sensors in the motor vehicle are wheel rotational speed sensors, steering angle sensors, acceleration sensors, rotational rate sensors, tire pressure sensors, distance sensors etc. The various sensors with which the vehicle is equipped are denoted by the reference number 161, 162 and 163 in FIG. 3.

However, the modern motor vehicle can also have further components such as video cameras 105, e.g., as a rear view camera or as a driver monitoring camera, or else as a front-mounted camera to observe the events on the road. Examples of further components are also a radar device for the implementation of a radar cruise controller or for implementation of a distance warning or collision warning device.

For several years driver assistance systems have been offered which detect the surroundings of the vehicle with radar sensor systems, lidar sensor systems or video sensor systems and form an internal representation of the driving situation by interpreting this sensor data, and on the basis of this knowledge execute increasingly demanding functions by informing and warning the driver as far as making targeted interventions into the driving of the vehicle. It is therefore possible, for example, to execute the longitudinal guidance on well-structured roads such as freeways automatically for a high proportion of the time by means of an ACC (Adaptive Cruise Control) system which is equipped with a radar sensor system.

In the motor vehicle there are then also further electronic devices. These are arranged more in the region of the passenger cell and are often also operated by the driver. Examples are user interface devices with which the driver can select driving modes but can also operate classic components. These include gear speed selection as well as flashing indicator light control, windshield wiper control, control of the lights etc. This user interface arrangement is provided with the reference number 130. The user interface arrangement 130 is also often equipped with a push and turn switch by means of which the driver can select the various menus which are displayed on a display in the cockpit. On the other hand, this category also includes a touch-sensitive display. This field even includes voice input for assisting the operator control.

A navigation system 120 which is also installed in the region of the cockpit is often differentiated from the above. The route which is displayed on a map can of course also be displayed on the display in the cockpit. Further components such as a hands free device can be present, but are not illustrated in more detail. The reference number 110 also denotes an on-board unit. This on-board unit 110 corresponds to a communication module via which the vehicle can receive and transmit mobile data. As described, this can be here a mobile radio communication module, e.g., according to the LTE-V standard or a WLAN module according to the IEEE 802.11p specification.

The devices in the passenger compartment are also networked to one another via a bus system which is denoted by the reference number 102. This can be, e.g., the high speed CAN bus system according to ISO 11898-2 standard, but is also present here in the disclosed embodiment for data transmission with a relatively high data rate between infotainment devices. The gateway 140 is provided for this purpose, the vehicle-relevant sensor data is to be transmitted via the communication module 110 to another vehicle or to the central processor unit 40. The gateway 140 is connected to the two different bus systems 102 and 104. The gateway 140 is configured to implement the data which it receives via the CAN bus 104 in such a way that the data are converted into the transmission format of the high speed CAN bus 102 so that they can be distributed into the packet specified there. To pass on this data externally, that is to say to another motor vehicle or to the central processor unit 40 the communication module 110 is also equipped to receive these data packets and in turn convert them into the transmission format of the correspondingly used communication standard. The gateway 140 can also be used as a computing means for other tasks.

Figure 4A:
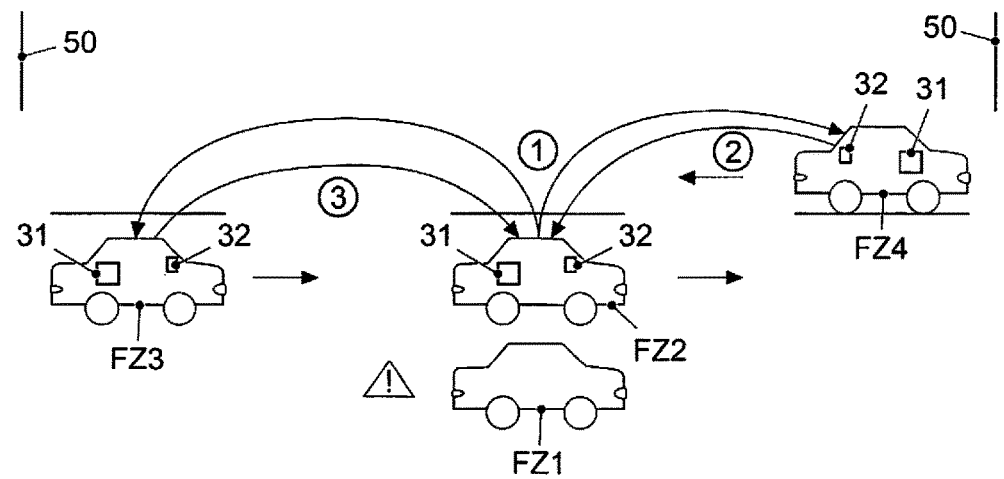
FIGS. 4a-b show the chronological sequencing of the data transmissions in the disclosed method for the collective perception of the surroundings.
Figure 4B:
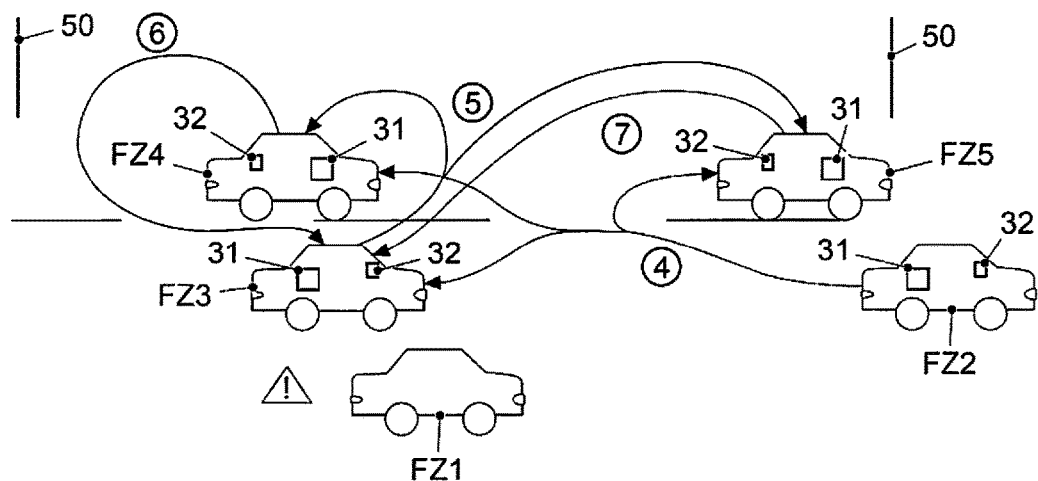

The disclosed method for the collective perception of the surroundings is illustrated in FIGS. 4a, 4b. Here, the case is considered that vehicles are traveling on public roads. FIG. 4a shows the situation in which a vehicle FZ1 has broken down and is positioned at the side of the road. It therefore constitutes an obstacle for the flowing traffic. The following traffic should be as far as possible warned about this obstacle. This is made possible by the radio communication between the vehicles. In this context, the flowing traffic is warned only in an area around the obstacle. For this purpose, a road is divided into sections in which the radio communication is passed on. A section can typically have a length of 200 to 600 meters. To divide the road into sections, in at least one disclosed embodiment the roadside units can be installed on the side of the road. In FIG. 4, the roadside units are denoted by the reference number 50. In another disclosed embodiment, the road can simply be divided cartographically into sections. The navigation systems 120 of the vehicles would therefore each monitor the position of the vehicle and have a look at the map to determine the section in which the vehicle is located.

FIG. 4a illustrates that the vehicles FZ2 and FZ3 are traveling on the side of the road on which the immobilized broken down vehicle FZ1 is located. Furthermore, an oncoming vehicle FZ4 is illustrated. In the example it is illustrated that the vehicles FZ2, FZ3, FZ4 are all equipped with an on-board unit 31 and observation means 32. In contrast, the broken down vehicle is not equipped with an on-board unit and not with observation means either. At first the vehicle FZ2 passes the broken down vehicle FZ1. Since a vehicle has not yet reported about the unequipped vehicle FZ1, this task falls to the vehicle FZ2, since it is the first vehicle to detect the vehicle FZ1.

One possible way of how the vehicle FZ2 can detect that the vehicle FZ1 is not equipped is to transmit an enquiry by radio to the vehicle FZ1 on the call channel provided for this purpose. If no response is made to this, vehicle FZ2 is to assume that the vehicle FZ1 is not equipped with a communication module.

The vehicle FZ2 then produces a report about the vehicle FZ1. The report typically contains one or more of the following pieces of information:
 Position
 Direction of movement
 Speed of movement
 Length
 Width
 Height
 Type of vehicle
 Accident/breakdown.

The enumeration is not meant to be conclusive and further or other vehicle characteristics can be included in the report. In addition, the vehicle FZ2 allocates an identifier to the unequipped vehicle and adds this identifier to the report. The identifier can be provided in a variety of forms, that is to say, for example, it can be an identification number, an identification word, an identification pictogram or some other suitable form of identification. Here the identification by the specification of the position of the vehicle is also mentioned.

In the case of stationary vehicles, the specification of the location is sufficient as the specification of the position. In the case of moving vehicles, the time reference can also be added for the specification of the location or one of the other possibilities is selected. The enumeration is again not meant to be conclusive.

The vehicle FZ2 then sends the report to the further vehicles of the respective road section. This may be done in broadcast form, that is to say the report is broadcast to all the vehicles which can receive it without individual addressing being performed. For such transmissions the sidelink channel Physical Sidelink Broadcast Channel PSBCH is available in the LTE-V communication system.

All the participating stations are registered in the WLAN ad hoc network and the report can also be transmitted to all the participating stations in the broadcast or multicast transmission mode. The methods developed in IEEE 802.11p are used for this, the methods permitting vehicle information to be transmitted to all the subscribers in the surroundings. In this respect reference is expressly made to the 802.11p standard.

The broadcasting of the report via vehicle FZ1 is marked in FIG. 4a by the reference symbol ①. The report is sent to both vehicles in the route section FZ3 and FZ4. In the next operation, the vehicles FZ3 and FZ4 transmit a confirmation message back to the reporting vehicle FZ1. The corresponding emissions of the confirmation message are marked by the reference symbols ② and ③. This may be done in the unicast transmission mode, that is to say addressed selectively for the reporting vehicle FZ2. In the case of LTE-V, the sidelink channel Physical Sidelink Shared Channel PSSCH is available for this. The content of the confirmation message may be composed of the identifier for the vehicle, as received in the report, and the hash value of the received report. Since a hash value is calculated by means of a hash function, it supplies, as in the case of a checksum, a variable with which it is possible to quickly determine whether the received report actually corresponds to the transmitted report. Errors in the report or falsifications of the report can therefore be quickly detected and discovered at the reporting vehicle FZ2 end.

In the subsequent time, the vehicle FZ2 regularly transmits a report about the vehicle FZ1. This can take place at short intervals, e.g., at an interval of 2s. If further vehicles enter the route section, they also confirm the receipt of the report. Any vehicle which confirms the report therefore also indicates that it is happy with the report and therefore itself refrains from transmitting a separate report.

The vehicles FZ2 to FZ4 move on and pass the vehicle FZ1. A short time later they exit the route section in which the vehicle FZ1 is positioned.

FIG. 4b then shows what is happening in terms of the production of a report about vehicle FZ1. Vehicle FZ2 has just left the route section in which vehicle FZ1 is located. Therefore, its function as a reporting vehicle also ends. Therefore, on exiting the route section vehicle FZ2 transmits a sign-off message to the further vehicles FZ3, FZ4 and FZ5 in the route section. In the meantime, the vehicle FZ5 has newly arrived in the respective route section. The sign-off message is transmitted again in broadcast form to the further vehicles. The sign-off message also contains the identifier for the vehicle FZ1. The process of emitting the sign-off message is provided with the reference symbol ④ in FIG. 4b. All the vehicles of the route section are now informed that no further reports about the vehicle FZ1 are being broadcast. Therefore, the first vehicle which detects vehicle FZ1 will itself report about this vehicle. This role falls in the illustrated example to the vehicle FZ3, since it is the next to pass the vehicle FZ1. Therefore, vehicle FZ3 transmits a report in broadcast form to the further vehicles in the route section at ⑤. However, in this case the vehicle uses in its own report the same identifier to vehicle FZ1 which it previously already received in the reports from vehicle FZ2. Therefore, the administration of the reports in the vehicles is simplified and a database can be more easily produced with the reports. The two further vehicles FZ4 and FZ5 transmit their confirmation messages to the reporting vehicle FZ3 at ⑥ and ⑦ as explained above.

It should be understood that the proposed method and the associated devices can be implemented in various forms of hardware, software, firmware, special processors or a combination thereof. Special processors can comprise application-specific integrated circuits (ASICs), reduced instruction set computer (RISC) and/or field programmable gate arrays (FPGAs). The proposed method and the device may be implemented as a combination of hardware and software. The software may be installed as an application program on a program storage device. This typically involves a machine based on a computer platform which has hardware such as, for example, one or more central processor units (CPU), a direct access memory (RAM) and one or more input/output (I/O) interface(s). Furthermore, an operating system is typically installed on the computer platform. The various processes and functions which have been described here may be part of the application program or a part which is executed via the operating system.

The disclosure is not limited to the exemplary embodiments described herein. There is space for various adaptations and modifications which a person skilled in the art would also take into account as forming part of the disclosure on the basis of his specialist knowledge.

LIST OF REFERENCE SYMBOLS

10 Internet
20 base station
30 vehicle
31 on-board unit
32 observation means
40 central processing unit
50 road-side unit
100 block diagram of vehicle electronics
102 high speed CAN bus
105 video camera
104 CAN bus
110 on-board unit
120 navigation system
130 user interface arrangement
140 gateway
151 engine control unit
152 ESP control device
153 ABS control device
161 sensor 1
162 sensor 2
163 sensor 3
FZ1 unequipped vehicle
FZ2 reporting vehicle
FZ3 further vehicle
FZ4 further vehicle
FZ5 further vehicle
① $1^{st}$ broadcast emission
② $1^{st}$ response
③ $2^{nd}$ response
④ sign-off message
⑤ $2^{nd}$ broadcast emission
⑥ $3^{rd}$ response
⑦ $4^{th}$ response

The invention claimed is:

1. A method for acquiring collective surroundings information comprising:
   transmitting an enquiry by a reporting vehicle equipped with a communication module to detect that a vehicle is not equipped with a communication module based on absence of a response from the unequipped vehicle;
   transmitting a report about the unequipped vehicle to further equipped vehicles; and transmitting a confirmation message by the further equipped vehicles to the reporting vehicle causing the further equipped vehicles to refrain from transmitting a separate report about the unequipped vehicle.

2. The method of claim 1, wherein reports are transmitted to the further equipped vehicles via a central server; and
   the confirmation messages are transmitted to the further equipped vehicles via the central server.

3. The method of claim 1, further comprising:
   assigning by the reporting vehicle an identifier to the unequipped vehicle and adding the identifier to the report.

4. The method of claim 3, further comprising:
   the further equipped vehicles transmitting back in the confirmation message, the unequipped vehicle identifier and a hash value of the report to the reporting vehicle.

5. The method of claim 3, further comprising:
   transmitting by the reporting vehicle a sign-off message to the further equipped vehicles that exist in a designated area; and
   continuing by the reporting vehicle production of the report about the unequipped vehicle;
   wherein the reporting vehicle continues to use the identifier of the unequipped vehicle.

6. The method of claim 3, wherein the identifier is derived at least in part from an observed position of the unequipped vehicle.

7. A system for acquiring collective surroundings information for use in a reporting vehicle comprising:
   a communication module in the reporting vehicle configured to transmit a report to further equipped vehicles located in a designated area;
   a surroundings observation means configured to detect a vehicle not equipped with a communication module in the designated area by transmitting an enquiry by the reporting vehicle to detect the unequipped vehicle based on absence of a response from the unequipped vehicle;
   a computing means configured to produce a report about the unequipped vehicle;
   the communication module further configured to transmit the report to the further equipped vehicles; and
   the communication module further configured to receive a confirmation message from the further equipped vehicles and to wait for the confirmation messages from the further equipped vehicles that the report was received thereby causing the further equipped vehicles to refrain from transmitting a separate report about the unequipped vehicle.

8. The system of claim 7, wherein the communication module is further configured: to transmit the reports to the further equipped vehicles via a central server; and
   transmit confirmation messages to the further equipped vehicles via the central server.

9. The system of claim 7 wherein the computing means is further configured to assign an identifier to the unequipped vehicle and add the identifier to the report.

10. The system of claim 9, wherein the communication module is further configured to transmit a sign-off message to the further equipped vehicles if the reporting vehicle exits the designated area.

11. The system of claim 9, wherein the communication module is further configured to transmit back, in the confirmation message, the unequipped vehicle identifier and a hash value of the report to the reporting vehicle.

12. The system of claim 9, wherein:
the communication module is further configured to transmit a sign-off message to the further equipped vehicles that exist in a designated area; and
the computing means is further configured to continue production of the report about the unequipped vehicle; and
wherein the communication module continues to use the identifier of the unequipped vehicle.

13. A system according to claim 7, wherein the surroundings observation means comprises at least one element of the components consisting of:
radar sensor;
video camera;
stereo camera;
plenoptics camera;
lidar sensor;
laser sensor;
ultrasound sensor; and
inclination sensor.

14. The system of claim 7, wherein the communication module is further configured to direct vehicle communication in one of the infrastructure domains consisting of LTE-V mobile radio system, mobile radio system 5G, and direct vehicle communication according to the WLAN standard IEEE 802.11p.

15. The system of claim 7 further comprising a position-determining means configured to estimate the position of the unequipped vehicle in a spatial or chronological direction.

16. The system of claim 7 further comprising a position-determining means configured to determine a position the unequipped vehicle in a spatial or chronological direction.

17. The system of claim 15, wherein the position determining means relates to a vehicle navigation system basis.

* * * * *